United States Patent [19]

Arai et al.

[11] Patent Number: 4,521,482

[45] Date of Patent: Jun. 4, 1985

[54] MAGNETIC RECORDING MEDIUM

[75] Inventors: Yoshihiro Arai; Akira Nahara, both of Kanagawa, Japan

[73] Assignee: Fuji Photo Film Co., Ltd., Kanagawa, Japan

[21] Appl. No.: 563,014

[22] Filed: Dec. 19, 1983

Related U.S. Application Data

[63] Continuation of Ser. No. 364,273, Apr. 2, 1982, abandoned.

[30] Foreign Application Priority Data

Apr. 2, 1982 [JP] Japan .................................. 57-49884

[51] Int. Cl.³ .......................... H01F 10/02; B05D 5/12
[52] U.S. Cl. ................................. 428/336; 204/192 N;
427/40; 427/41; 427/129; 427/131; 427/132;
427/250; 427/296; 428/412; 428/425.8;
428/457; 428/695; 428/900

[58] Field of Search .................... 427/127–132,
427/48, 40, 41, 250, 296; 428/900, 695, 336,
425.8, 412, 457; 204/192 N

[56] References Cited

U.S. PATENT DOCUMENTS

| 3,466,156 | 9/1969 | Peters et al. ......................... 340/174 |
| 4,171,388 | 10/1979 | Allen et al. ...................... 427/131 X |
| 4,239,835 | 12/1980 | Iijima et al. ......................... 428/611 |
| 4,333,985 | 6/1982 | Shirahata et al. ............... 428/694 X |

Primary Examiner—Bernard D. Pianalto
Attorney, Agent, or Firm—Sughrue, Mion, Zinn, Macpeak & Seas

[57] ABSTRACT

A magnetic recording medium having a layer of an organic polymer formed on an oblique vapor deposited magnetic metal film is disclosed. A layer of a higher aliphatic acid and/or an ester thereof is also formed on said polymer layer.

11 Claims, 4 Drawing Figures

MAGNETIC RECORDING MEDIUM

This application is a continuation of application Ser. No. 364,273, filed Apr. 2, 1982, abandoned.

FIELD OF THE INVENTION

The present invention relates to a magnetic recording medium having a magnetic recording layer formed by oblique vapor deposition of a thin ferromagnetic metal film, more particularly, to a magnetic recording medium having good running properties, weatherproofness, and durability.

BACKGROUND OF THE INVENTION

Most conventional magnetic recording media are of the coated type and are produced by dispersing particles of magnetic oxides or ferromagnetic alloys such as $\gamma$-$Fe_2O_3$, Co-doped $\gamma$-$Fe_2O_3$, $Fe_3O_4$, Co-doped $Fe_3O_4$, a Berthollide compound of $\gamma$-$Fe_2O_3$ and $Fe_3O_4$, and $CrO_2$ in an organic binder such as a vinyl chloride/vinyl acetate copolymer, a styrene/butadiene copolymer, an epoxy resin or polyurethane resin, applying the resulting coating solution to a non-magnetic base, and drying the coating.

However, with the recent demand for higher density recording, researchers' attention has been drawn to binderless magnetic recording media of the thin metal film type which uses a thin ferromagnetic metal film as a magnetic recording layer, the film being formed by a vapor deposition such as vacuum deposition, sputtering and ion plating, or by a plating such as electroplating and electrolessplating. Accordingly, various efforts are being made to develop such products which can be used on a commercial basis.

Most conventional magnetic recording media of the coated type use a magnetic material of a metal oxide having a lower saturation magnetization than ferromagnetic metals; accordingly, attempts to achieve high density recording by using thinner magnetic recording media have inevitably resulted in a decreased signal output, thus putting limits on the uses of such thin magnetic films. Furthermore, processes of manufacturing such thin magnetic recording media of the coated type are complex and require large scale equipment for solvent recovery and pollution control.

In distinction, with binderless magnetic recording media, a very thin magnetic recording layer necessary for high density recording can be formed using a ferromagnetic metal having a higher saturation magnetization than the above magnetic oxides without using a non-magnetic material such as a binder and such recording media can be manufactured by a simple process.

It has been confirmed, both theoretically and empirically, that two requirements for a magnetic recording medium adapted for high density recording are high coercive force and thinness. Therefore, there is the expectation that binderless magnetic recording media can be made which are as thin as one-tenth the thickness of magnetic recording media of the coated type and which have a higher saturation flux density than the latter.

It is highly advantageous to form a thin magnetic film by vacuum deposition since this method yields the desired thin metal film rapidly, involves simple manufacturing steps and requires no effluent treatment (unlike plating). A method of vacuum deposition that is capable of yielding a magnetic film having a high coercive force and squareness ratio (desired for magnetic recording media) is what is called the "oblique vapor deposition" method, and such is described in U.S. Pat. Nos. 3,342,632, 3,342,633, etc. In this method, the greater the angle of incidence of a vapor stream that is directed onto the substrate, the greater the coercive force possessed by the resulting magnetic medium. However, a high angle of incidence also results in decreased deposition efficiency.

Other requirements that must be met by magnetic recording media using a thin ferromagnetic metal film are high resistance to corrosion and wear as well as consistent running properties. In the recording, the reproduction and the erase modes, the magnetic recording medium runs at high speed relative to the magnetic head(s) and it must run smoothly and consistently. At the same time, it should not be worn or broken by contact with the head and it is required that the recorded signal not be decreased or lost due to corrosion or other factors when the medium is stored. One method has been proposed to provide better durability and weatherproofness by use of a protective layer, but the protective layer cannot be made too thick if spacing loss between a recording head and a magnetic layer is to be prevented. It is therefore necessary to produce a magnetic film which itself is durable and proof against weather.

To solve these problems, Japanese Patent Application (OPI) No. 153707/77 (the term "OPI" as used herein refers to a "published unexamined Japanese patent application") proposes a method where the surface of a binderless mgnetic recording medium is coated with a polymeric material and Japanese Patent Application (OPI) No. 88704/78 discloses a method where at least one surface of a magnetic recording medium is coated with a surfactant having an HLB value of 5 to 30. Both of these methods are "wet" methods and use a solvent (that may be a pollutant) and they require special apparatus for mold inhibition. As a further disadvantage, when a web having a vapor deposited thin ferromagnetic film is taken out of the vacuum chamber in which deposition occurs or when it is coated with a polymeric material or a surfactant, the ferromagnetic film may be exposed to air and its surface may be oxidized or otherwise deteriorated, or pinholes that cause dropout may develop upon rubbing.

To solve these problems, Japanese Patent Application No. 82709/79 proposes a process for producing a magnetic recording medium characterized by vapor depositing a polymeric material on the surface of a magnetic recording medium; Japanese Patent Application No. 82710/79 describes a process for producing a magnetic recording medium characterized by vapor depositing an organic lubricant and a polymeric material on the surface of a magnetic recording medium simultaneously; and Japanese Patent Application (OPI) No. 154306/79 discloses a process for producing a wear resistant magnetic recording medium characterized by vapor depositing a layer of higher aliphatic acid on the surface of a magnetic recording medium. However, none of these methods are capable of providing a recording medium having satisfactory running properties and wear resistance. The method of Japanese Patent Application No. 82709/79 does not achieve adequate improvement in running properties and Japanese Patent Application No. 82710/79 and Japanese Patent Application (OPI) No. 15306/79 do not provide desired long-term stability.

SUMMARY OF THE INVENTION

It is, therefore, the primary object of the present invention to provide a magnetic recording medium having high wear resistance and good running properties.

This object of the present invention can be achieved by vapor depositing a layer of an organic polymer on the surface of a magnetic metal film and then vapor depositing a layer of a higher aliphatic acid and/or an ester thereof on the polymer layer.

DETAILED DESCRIPTION OF THE INVENTION

Figure 1:
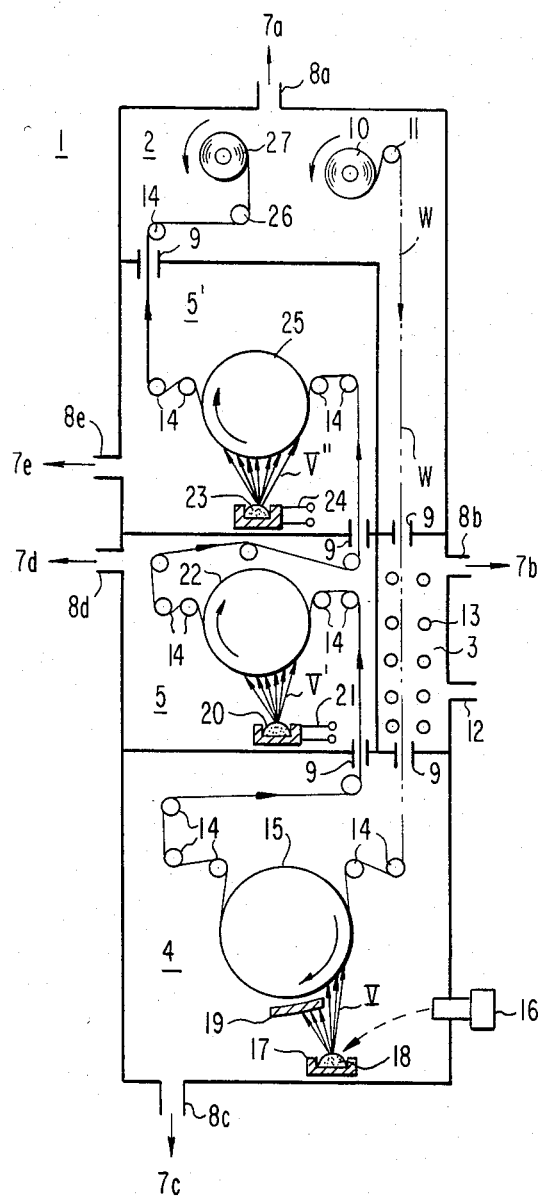
FIG. 1 is a side elevational view showing the essential parts of a vapor deposition apparatus useful in the production of a magnetic recording medium of the present invention.

The vapor deposition apparatus shown in FIG. 1 comprises a substrate delivery and takeup chamber 2, a glow discharge treatment chamber 3, a magnetic film depositing chamber 4, and first and second protective layer depositing chambers 5 and 5′, all chambers being connected to each other by small slits 9 through which the substrate is passed. The respective chambers 2 to 5′ communicate with independent evacuating means 7a to 7e through conduits 8a to 8e, and independent degrees of vacuum (usually in the range of from $10^{-2}$ to $10^{-6}$ Torr) can be created in the respective chambers.

In the delivery and takeup chamber 2, an idler roller 11 positioned close to a rotatably supported roll 10 made of a non-magnetic flexible substrate band W is driven to continuously deliver the substrate W from roll 10 into the glow discharge treatment chamber 3, where argon gas supplied through pipe 12 forms a glow discharge in a vacuum of about $7 \times 10^{-1}$ to $1 \times 10^{-3}$ Torr by being heated via electrodes 13 supplied with a high a.c. voltage (of, e.g., about 200 volt to 6 kilovolt). The oxygen, nitrogen, helium and neon gases can be used in place of argon gas. The purpose of the glow discharge is to clean the surface of substrate W for 0.2 to 3.0 sec, activate it and make it more susceptible to the vacuum deposition of a thin magnetic film in the next step.

The substrate W passes from glow discharge treatment chamber 3 and is fed into deposition chamber 4 where it is directed by a plurality of guide rollers 14; after its running direction is reversed by a rotatably supported cooling drum 15 which comprises a shell mainly made of a stainless steel and has a cooling water of a room temperature therein, it will be supplied to first protective layer deposition chamber 5.

Figure 2:
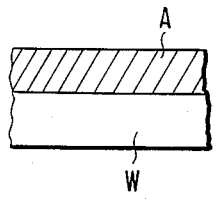
FIGS. 2 to 4 are cross-sectional views of a magnetic recording medium in three stages of its production.

A fairly high degreee of vacuum (e.g., about $2 \times 10^{-4}$ to $6 \times 10^{-6}$ Torr) is created in chamber 4 and a body of metal 18 to be evaporated (e.g., metallic Co, Ni or Fe or alloys thereof) in a hearth 17 is heated by an electron beam heater 16 comprising an electron gun and a power supply, and evaporated metal stream V is deposited on the substrate W on the cooling drum 15 at an angle of incidence of usually from about 30° to 90° to form a thin magnetic film indicated as A in FIG. 2. The angle of incidence of the vapor stream is adjusted in a conventional manner by the arrangement of the hearth 17 and a mask 19, preferably 45° to 90°.

Figure 3:
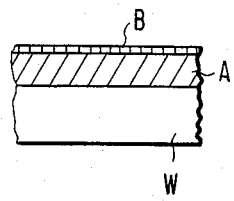

The first protective layer deposition chamber 5 is evacuated to a vacuum of about $1 \times 10^{-3}$ to $6 \times 10^{-5}$ Torr and a body of an organic polymer 20 is heated by a resistance heater 21, the evaporated polymeric material stream V′ being deposited on substrate W as it is directed by a cooling drum 22 to thereby form a polymer layer indicated as B in FIG. 3.

Figure 4:
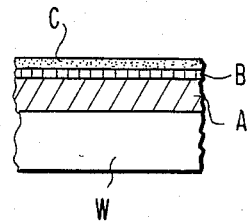

The substrate W is subsequently fed into the second protective layer deposition chamber 5′ which is evacuated to a vacuum of about $4 \times 10^{-4}$ to $3 \times 10^{-5}$ Torr. In chamber 5′, a body 23 of an aliphatic acid or an aliphatic acid ester or a mixture thereof is heated by a resistance heater 24, and the resulting vapor stream V″ is deposited onto substrate W as it is directed by a cooling drum 25 to form a second protective layer indicated as C in FIG. 4. The substrate is then delivered into takeup chamber 2, stretched in a conventional manner by expander roller 26 to remove any wrinkles and then taken up by roll 27 to complete the entire process of thin film making.

Suitable magnetic metallic materials of which the thin magnetic film can be made include metals such as Fe, Co, Ni or the like and ferromagnetic alloys such as Fe-Co, Fe-Ni, Co-Ni, Fe-Co-Ni, Fe-Rh, Fe-Cu, Co-Cu, Co-Au, Co-Y, Co-La, Co-Pr, Co-Gd, Co-Sm, Co-Pt, Ni-Cu, Mn-Bi, Mn-Sb, Mn-Al, Fe-Cr, Co-Cr, Ni-Cr, Fe-Co-Cr, Ni-Co-Cr, Fe-Co-Ni-Cr or the like. Metallic Co or an alloy containing 75 wt% of Co is particularly preferred.

If the thin magnetic film is made of two or more layers, its total thickness is such that it is thick enough to provide an output sufficient as a magnetic recording medium but it must be thin enough to achieve high density recording. To meet these requirements, the thickness of a composite magnetic film is generally in the range of from 200 Å to 20,000 Å, preferably from 500 Å to 10,000 Å. Each sublayer may have the same thickness, or alternatively, the thickness of the sublayer(s) other than the layer closest to the substrate is within the range of ±50% of the thickness of the layer closest to the substrate. If the main magnetic film is made of a single layer, the thickness of a magnetic film is preferably 150 to 5,000 Å.

The term "vapor deposition" as used herein means not only the conventional vacuum deposition method described in U.S. Pat. No. 3,342,632, but also the method where a thin film is formed on a substrate in an atmosphere containing vapor molecules having a large mean free path produced by ionization or acceleration of the vapor stream in an electric field, magnetic field or by irradiation with electron beams. Among examples of such methods are the electric field vapor deposition method described in Japanese Patent Application No. (OPI) 149008/76; the ionized vapor deposition method described in Japanese Patent Publication Nos. 11525/68, 20484/71, 26579/72, 45439/74 and Japanese Patent Application (OPI) Nos. 33890/74, 34483/74 and 54235/74. Ion sputtering and plasma polymerization may also be used in the present invention.

Suitable substrates for use in the present invention are plastic bases such as polyethylene terephthalate, polyimides, polyamides, polyvinyl chloride, triacetyl cellulose and polycarbonates. The preferred substrates have characteristics such as the glass transition point of 70° C. or more, high resistance to heat and smoothness. A flexible plastic base made of these materials and having a surface roughness (ra: a center average roughness defined by JIS 0601) of less than 0.12 μm is particularly preferred.

The organic polymer from which the first protective layer is produced are preferably an organic material having a carbonate bond at least part of which is made of bisphenol A, an organic material having a styrene group or a urethane bond, an organic material having polyvinyl butyral or a mixture thereof, more preferably polycarbonate which is represented by

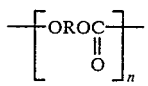

wherein R is bisphenol A, polyurethane having a molecular weight of 30,000 or more which is an ester type urethane wherein urethane-bond concentration is 1.5 mole/1,000 g or more, polyvinyl butyral or a mixture thereof. The thickness of a first protective layer of an organic polymer is preferably about 10 to 250 Å.

Suitable higher aliphatic acids from which the second protective layer is formed are an aliphatic acid having 12 carbon atoms or more such as lauric acid, myristic acid, palmitic acid, stearic acid, behenic acid, oleic acid, linolic acid, linolenic acid and arachidonic acid. Suitable aliphatic acid esters from which the second protective layer may be formed are methyl stearate, ethyl palmitate and monoglyceride stearate. The thickness of a second protective layer of a higher aliphatic acid or an ester of the higher aliphatic acid or the mixture thereof is preferably about 20 to 400 Å.

In the illustrated embodiment, the first and second protective layers are formed sequentially on the substrate W using two separate cooling drums 22 and 25 provided in the first and second protective layer deposition chambers 5 and 5', respectively; however, in another embodiment the substrate W may be caused to travel along a serpentine path within the same chamber. Whichever method is used, the total thickness of the first layer and the second protective layer(s) is generally in the range of from 20 to 500 Å, preferably from 20 to 300 Å.

According to the present invention, a magnetic recording medium suitable for high density recording can be produced without complex processing comprising making of a magnetic particle, preparation of a coating solution and application of such solution. Also, no solvent is used so that provisions for solvent recovery, pollution control and mold inhibition are not necessary.

As a further advantage, by successively vapor depositing the layer of a polymeric material and then a layer of a higher aliphatic acid and/or aliphatic acid ester on the thin ferromagnetic film within the apparatus in which the thin ferromagnetic film has been vapor deposited, the first and second protective layers can be formed without interrupting the vacuum in said chamber. As a result, various undesired effects such as oxidative deterioration of the thin ferromagnetic film, pinholes due to abrasion, shedding of the magnetic film and buildup of dirt and other foreign materials can be prevented, and a magnetic recording medium having very few dropouts and hence having improved recording/reproducing characteristics is obtained.

The present invention also provides a recording medium having high weatherproofness, good running properties and longer still life.

The present invention is now described by reference to the following example which is given here for illustrative purposes only and is by no means intended to limit its scope.

EXAMPLE

Apparatus, essentially as in FIG. 1 was used.

99.99% pure metallic cobalt was placed in the hearth in the vacuum deposition chamber evacuated to a vacuum pressure of about $1 \times 10^{-5}$ Torr. The hearth was heated by an electron beam heater and the vaporized cobalt was directed onto a polyethylene terephthalate film substrate having a thickness of 25μ at an angle of incidence of 60° from the normal to the substrate. The deposition rate was 2 Å/sec and the deposited film thickness was 2,000 Å.

Subsequently, a polycarbonate layer was vapor deposited thereon by resistance heating using a hearth maintained at 300° to 500° C. at a rate of 5 Å/sec in a vacuum of $7 \times 10^{-4}$ Torr to form a first protective layer of a thickness of 80 Å.

A behenic acid layer was then vapor deposited thereon by resistance heating at a rate of 20 Å/sec in a vacuum of $1 \times 10^{-4}$ Torr to form a second protective layer of a thickness of 150 Å.

The resulting recording medium had good running properties, high weatherproofness and long still life. The still life of the product given indicated in Table 1 below and was determined by measuring the time required for the output signal from the sample in a still mode on a VTR to be reduced by half. Table 1 also shows the still life characteristics of a control (a) having no overcoat on the magnetic film and a control (b) having only a polycarbonate layer. As is seen from Table 1, magnetic film (c) having the first and second protective layers according to the present invention had much longer still life than the controls. In this Example, the behenic acid layer was vapor deposited following the deposition of the polycarbonate layer without interrupting the vacuum created for the deposition of the latter, but it should be noted that the second protective layer may be formed after interrupting the vacuum created in the chamber for deposition of the first protective layer.

TABLE 1

| Sample No. | Still Life (min) |
|---|---|
| (a) Only Co magnetic film; no overcoat | 1 |
| (b) Co magnetic film plus polycarbonate layer | 5 |
| (c) Co magnetic film plus polycarbonate/ behenic acid layers | 30 |

While the invention has been described in detail and with reference to specific embodiments thereof, it will be apparent to one skilled in the art that various changes and modifications can be made therein without departing from the spirit and scope thereof.

What is claimed is:

1. A magnetic recording medium having a layer of an organic polymer formed on an oblique vapor deposited magnetic metal film and a layer of a higher aliphatic acid and/or an ester thereof being formed on said polymer layer, wherein both said organic polymer layer and said higher aliphatic acid and/or ester thereof layer are formed by vacuum deposition, ion plating, ion sputtering or plasma polymerization, and wherein said organic polymer layer has a thickness of about 10 to 250 Å and said layer of aliphatic acid and/or ester thereof has a thickness of about 20 to 400 Å.

2. A magnetic recording medium according to claim 1 wherein both the organic polymer layer and the higher aliphatic layer and/or ester layer thereof are formed by vacuum deposition.

3. A magnet recording medium according to claim 1, wherein said layer of organic polymer comprises an organic material having a carbonate bond at least part of which is made of bisphenol A, an organic material having a styrene group or a urethane bond, an organic material having polyvinyl butyral or a mixture thereof.

4. A magnetic recording medium according to claim 1, wherein said higher aliphatic acid or aliphatic acid ester is selected from myristic acid, stearic acid, behenic acid, oleic acid, palmitic acid or a mixture thereof, or an ester of these acids.

5. A magnetic recording medium according to claim 1, wherein said oblique vapor deposited magnetic metal film is formed by vapor depositing the evaporated metal stream on the substrate at an angle of incidence of from about 30° to 90°.

6. A magnetic recording medium according to claim 5, wherein said angle of incidence of the vapor stream is 45° to 90°.

7. A magnetic recording medium according to claim 5, wherein said substrate is a substrate of which the surface is glow discharged under a vacuum degree of about $7 \times 10^{-1}$ to $1 \times 10^{-3}$ Torr.

8. A magnetic recording medium according to claim 5, wherein said oblique vapor deposited magnetic metal film is formed under a vacuum degree of about $2 \times 10^{-4}$ to $6 \times 10^{-6}$ Torr.

9. A magnetic recording medium according to claim 1, wherein said oblique vapor deposited magnetic metal film is formed under a vacuum degree of about $2 \times 10^{-4}$ to $6 \times 10^{-6}$ Torr.

10. A magnetic recording medium according to claim 1, wherein said organic polymer layer is formed under a vacuum degree of about $1 \times 10^{-3}$ to $6 \times 10^{-5}$ Torr.

11. A magnetic recording medium according to claim 1, wherein said layer of a higher aliphatic acid and/or an ester thereof is formed under a vacuum degree of about $4 \times 10^{-4}$ to $3 \times 10^{-5}$ Torr.

* * * * *

UNITED STATES PATENT AND TRADEMARK OFFICE
CERTIFICATE OF CORRECTION

PATENT NO. : 4,521,482

DATED : June 4, 1985

INVENTOR(S) : Yoshihiro Arai et al.

It is certified that error appears in the above-identified patent and that said Letters Patent is hereby corrected as shown below:

Cover page, left column, under the heading "[30] Foreign Application Priority Data" kindly delete "1982" and substitute therefor --1981-- and kindly delete "57-49884" and substitute therefor --56-49884--.

Signed and Sealed this

Third Day of December 1985

[SEAL]

Attest:

DONALD J. QUIGG

Attesting Officer     Commissioner of Patents and Trademarks